US009473807B2

(12) United States Patent
Hardy et al.

(10) Patent No.: US 9,473,807 B2
(45) Date of Patent: Oct. 18, 2016

(54) METHODS AND APPARATUS FOR MOVING VIDEO CONTENT TO INTEGRATED VIRTUAL ENVIRONMENT DEVICES

(71) Applicant: ECHOSTAR TECHNOLOGIES L.L.C., Englewood, CO (US)

(72) Inventors: Christofer Hardy, Cheyenne, WY (US); Thomas Allan Yarborough, Cheyenne, WY (US)

(73) Assignee: EchoStar Technologies L.L.C., Englewood, CO (US)

( * ) Notice: Subject to any disclaimer, the term of this patent is extended or adjusted under 35 U.S.C. 154(b) by 668 days.

(21) Appl. No.: 13/906,512

(22) Filed: May 31, 2013

(65) Prior Publication Data

US 2014/0359654 A1    Dec. 4, 2014

(51) Int. Cl.
| | |
|---|---|
| *H04N 21/41* | (2011.01) |
| *H04N 21/266* | (2011.01) |
| *H04N 21/482* | (2011.01) |
| *H04N 21/485* | (2011.01) |
| *H04N 21/436* | (2011.01) |
| *H04W 76/00* | (2009.01) |

(52) U.S. Cl.
CPC .... *H04N 21/4126* (2013.01); *H04N 21/26613* (2013.01); *H04N 21/43615* (2013.01); *H04N 21/482* (2013.01); *H04N 21/4854* (2013.01); *H04W 76/00* (2013.01)

(58) Field of Classification Search
CPC .......... G06Q 10/067; G06F 17/30873; G06F 17/30979; G06K 9/00369; G06T 9/00; H04N 21/4755; H04N 21/4126; H04N 21/26613; H04N 21/482; H04N 21/4854
See application file for complete search history.

(56) References Cited

U.S. PATENT DOCUMENTS

| | | | | |
|---|---|---|---|---|
| 6,850,252 | B1 * | 2/2005 | Hoffberg | G06K 9/00369 348/E7.061 |
| 8,848,792 | B2 * | 9/2014 | MacInnis | G06T 9/00 375/240.15 |
| 2003/0229900 | A1 * | 12/2003 | Reisman | G06F 17/30873 725/87 |
| 2012/0023521 | A1 * | 1/2012 | Lordan | H04N 21/4755 725/35 |
| 2012/0069131 | A1 * | 3/2012 | Abelow | G06Q 10/067 348/14.01 |
| 2012/0078954 | A1 * | 3/2012 | Araya | G06F 17/30979 707/769 |

* cited by examiner

*Primary Examiner* — Kandasamy Thangavelu
(74) *Attorney, Agent, or Firm* — LK Global

(57) ABSTRACT

A media transfer method includes displaying, on a display device, a program guide including a plurality of items corresponding to media content; determining which of the plurality items are moveable items; displaying, on an integrated virtual environment device, an image identifying the moveable items; and transferring at least one of the moveable items to the integrated virtual environment device in response to a selection made via the integrated virtual environment device.

20 Claims, 4 Drawing Sheets

METHODS AND APPARATUS FOR MOVING VIDEO CONTENT TO INTEGRATED VIRTUAL ENVIRONMENT DEVICES

TECHNICAL FIELD

The present disclosure generally relates to systems and techniques for delivering media content, advertisements, and other content to home entertainment systems. More particularly, the present disclosure relates to the use of integrated virtual environment devices in connection with such systems.

BACKGROUND

Home entertainment systems typically include at least one component capable of displaying a program guide or other such graphical display that informs the user which media content is available for viewing. In some cases, it is desirable to transfer all or a portion of that media content to a mobile device for later viewing. Such devices have traditionally included such things as laptop computers, tablet computers, and smart phones. In recent years, however, various types of integrated virtual environment devices (such as head-worn "glasses"-like devices) have increased in popularity, and it is anticipated that users of such devices might find it convenient to transfer media content to those device from their set-top-boxes or other entertainment components. However, for various reasons, not all media content may be transferred from one device to another, and it is typically not easy or intuitive to determine which content may be selected for transfer.

It is therefore desirable to provide improved systems and methods for selecting and transferring media content to integrated virtual environment devices. These and other desirable features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements.

DETAILED DESCRIPTION

In general, the embodiments described herein relate to an "augmented reality" method for selecting and moving (i.e., downloading) content to an integrated virtual environment device (e.g., a wearable computing device). In that regard, the following detailed description of the invention is merely exemplary in nature and is not intended to limit the invention or the application and uses of the invention. Furthermore, there is no intention to be bound by any theory presented in the preceding background or the following detailed description.

Figure 1:
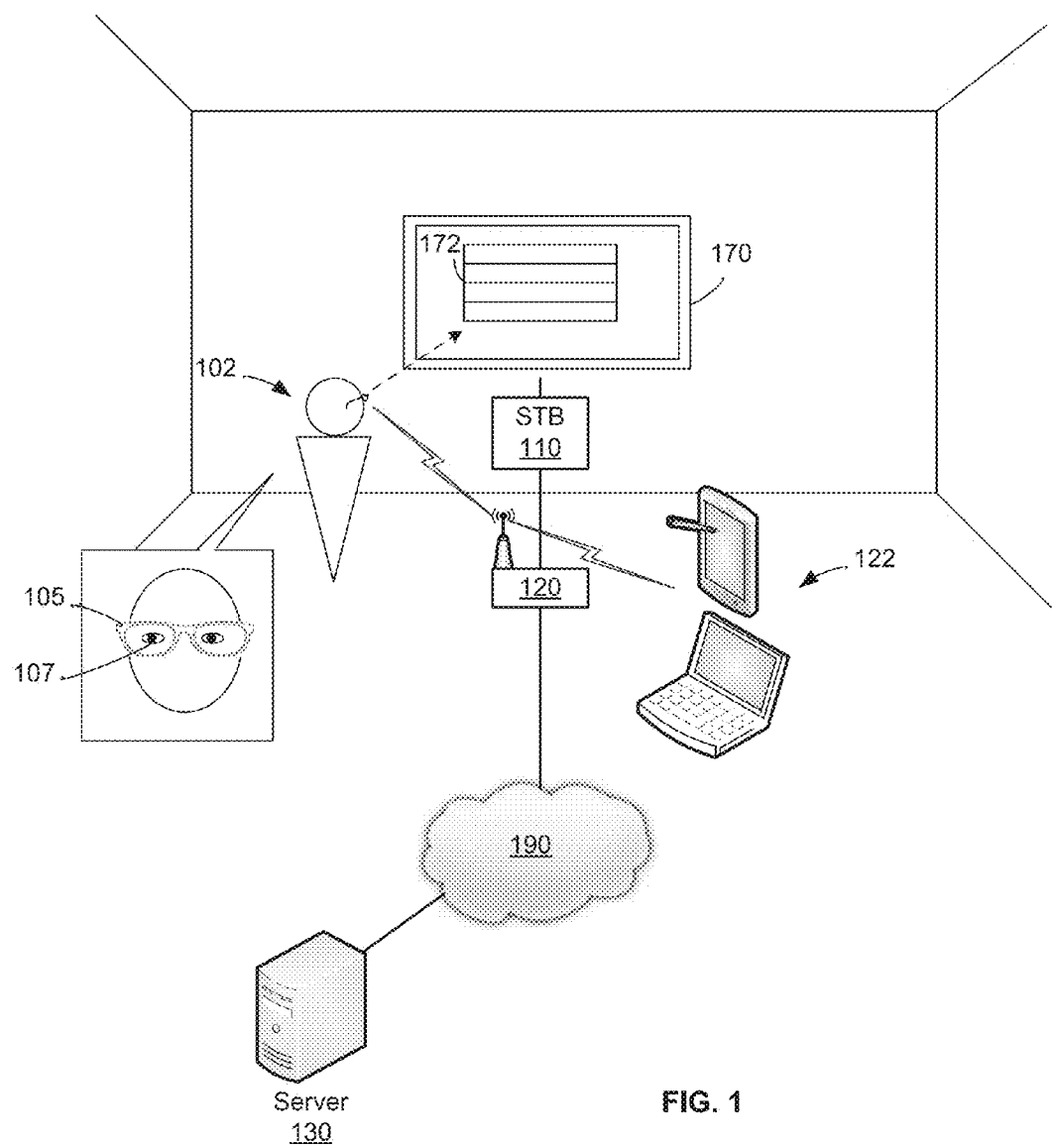
FIG. 1 is a conceptual overview of a content delivery system useful in describing various embodiments.

FIG. 1 presents a conceptual overview of a system in which the present systems and methods may be implemented. As shown, a user 102 is represented schematically as facing a display device 170, for example, a liquid crystal display (LCD), organic light-emitting diode (OLED) display, or other such display. Display device 170 is communicatively coupled (e.g., via any convenient form of wired or wireless communication) to an external component such as a set-top box (STB) 110 and/or other media sources that provide a signal that is processed and ultimately results in an image displayed by the display device 170. At any particular time, the image will typically include media content (e.g., a movie, TV show, or the like) and/or commercial content. At other times, as illustrated, display device 170 is used to provide a program guide 172 or other graphics that allow content to be selected.

Media sources may include a wide range of sources now known or later developed, including, for example, broadcast television, cable television, satellite television, "video-on-demand" or similar sources, digital video disk (DVD) players and other removable media, video camera systems, video game consoles, set-top box (STB) systems, Internet media sources (e.g., YouTube), and the like. The systems and methods described herein may be implemented in conjunction with a variety of home entertainment devices and/or other media components. For example, the present invention may be implemented in the context of a placeshifting system.

Figure 2:
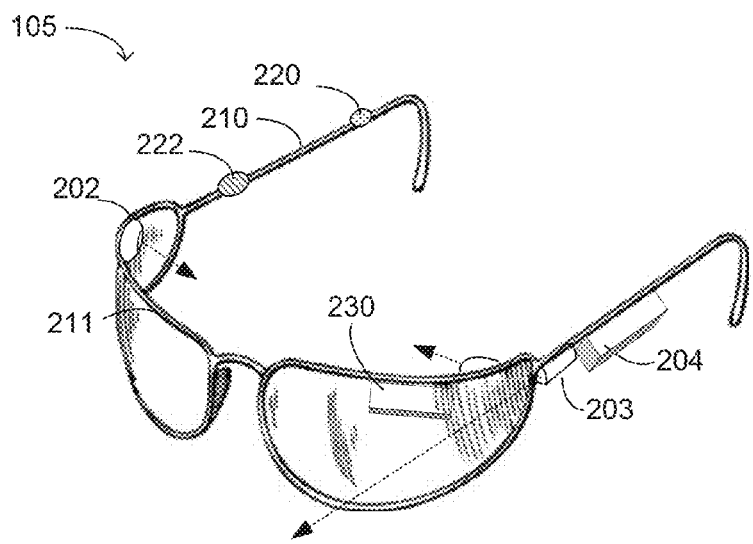
FIG. 2 is a conceptual illustration of an exemplary integrated virtual environment device.

User 102 interacts with some form integrated virtual environment device 105. In general, integrated virtual environment device (IVE) (or simply "device") 105 comprises any combination of hardware and software capable of performing the functions described herein. A wide range of devices may be used for this purpose. In recent years, for example, various types of wearable computing devices have become popular, including eyewear that incorporates advanced functionality. With reference to FIG. 2, for example, device 105 may comprise eyewear (or any other wearable structure) incorporating one or more forward-facing cameras 203 and one or more backward-facing cameras 202 attached to frame front 211, temple components 210, or other portions of the frame. In one embodiment, backward-facing cameras 202 are adapted for tracking the position of one or more of the user's eyes (e.g., eye 107 in FIG. 1) and determining whether the user's eyes are open or closed. Forward facing camera 203 is capable of capturing an image and/or video stream corresponding to whatever is within the user's field of view.

Device 105 further includes an integrated display screen 230 within the eye-line of the user (e.g., a projector/prism assembly as is known in the art). When worn, user 102 is capable of viewing the content provided on display screen 230, which in some embodiments may appear as a semi-transparent "layer" on top of reality (i.e., the environment around user 102). This media content may include, for example, video files stored (e.g., buffered) within memory 306 or content streamed to device 105 from one or more external sources (STB 110, network 190, server 130, or the like). As will be described in further detail below, media content may be selected by the user using device 105 and subsequently moved (entirely, or in part) to device 105 for viewing at another place and/or time on integrated display screen 230.

Device 105 may also include a speaker 220 (e.g., a conventional audio speaker or a bone-conduction device), and a microphone 222. One or more surfaces of device 105 may incorporate a touch pad or other user interface component. For example, an exposed surface of processing system 204 might function as a touch pad. One or more other such components, such as buttons, sliders, etc., might also be employed.

Figure 3:
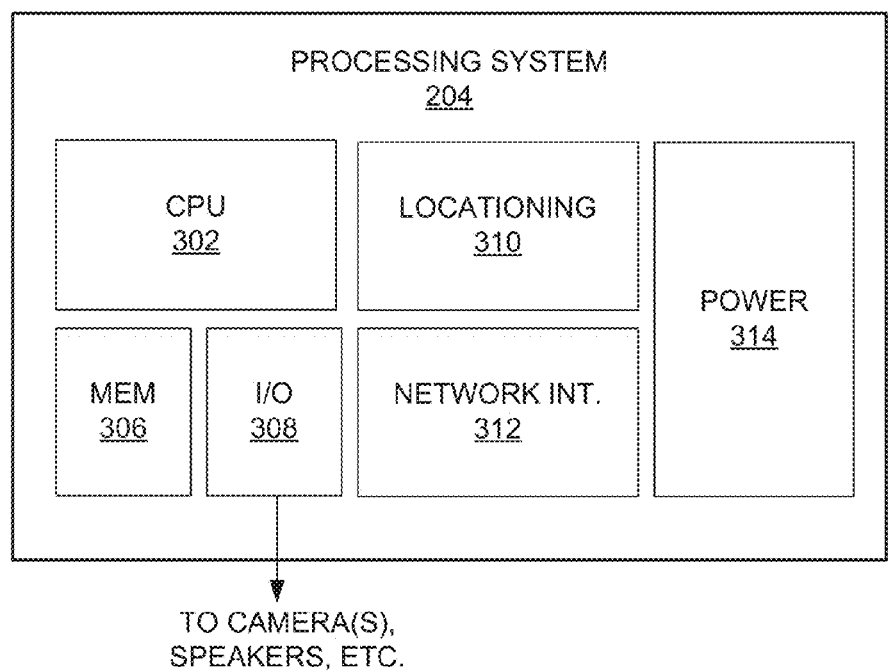
FIG. 3 is a conceptual block diagram of a processing system in accordance with one embodiment.

Referring now to FIG. 3, in the illustrated embodiment processing system 204 includes a CPU 302, a memory component (e.g., RAM) 306, an input/output interface 308 (i.e., for communicating with the various cameras, speakers, etc. of device 105), a locationing module 310 (including, for example, GPS, a multi-axis accelerometer, and/or compass submodules), a network interface (e.g., Bluetooth, WiFi, etc.).

Referring again to FIG. 1, device 105 is communicatively coupled through one or more networks and/or other communication channels to a server 130 (e.g., a server containing video content). Various additional mobile devices 122 (e.g., laptops, tablet computers, smart phones, or the like) may also be used within the local network to provide a "second screen" experience. In one embodiment, as illustrated, device 105 is wirelessly coupled to a conventional IEEE 802.11 (WiFi) access point 120 and/or router that is coupled to network 190 (e.g., the Internet). The embodiments are not so limited, however. Device 102 may, for example, communicate through a Bluetooth connection with a smart-phone or other mobile device, which is then coupled to network 190 through WiFi, a cellular network, or the like. In general, the present embodiments comprehend any architecture that allows device 102 to communicate with server 130 and/or STB 110.

Figure 4:
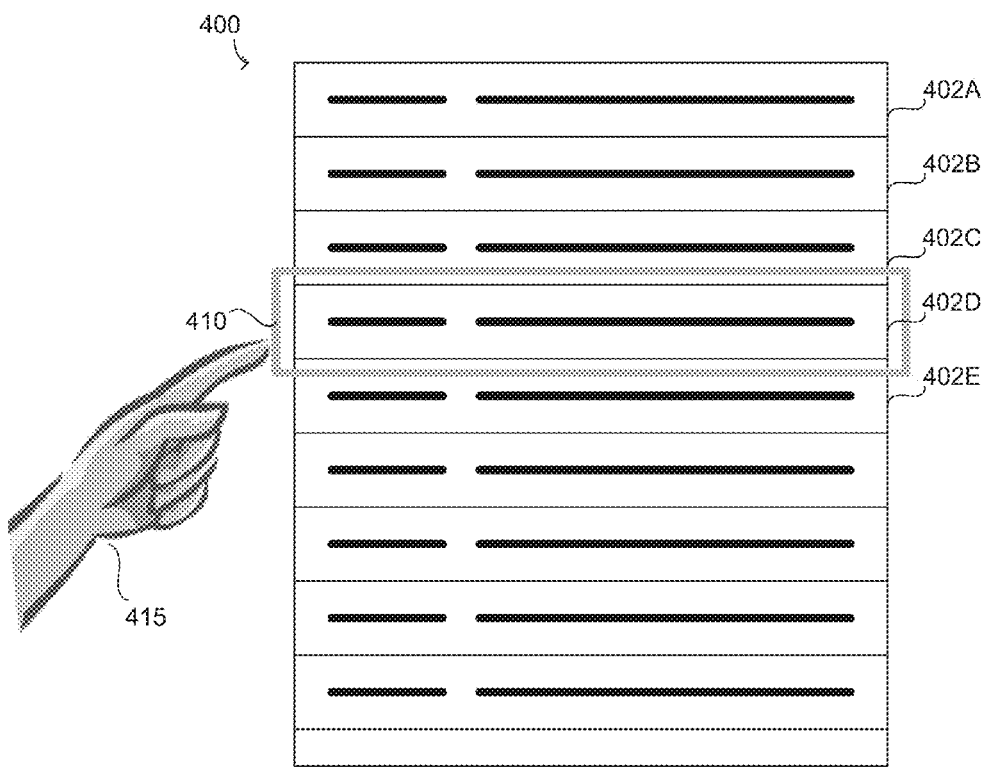
FIG. 4 is depicts the selection of video content in accordance with one embodiment.
Figure 5:
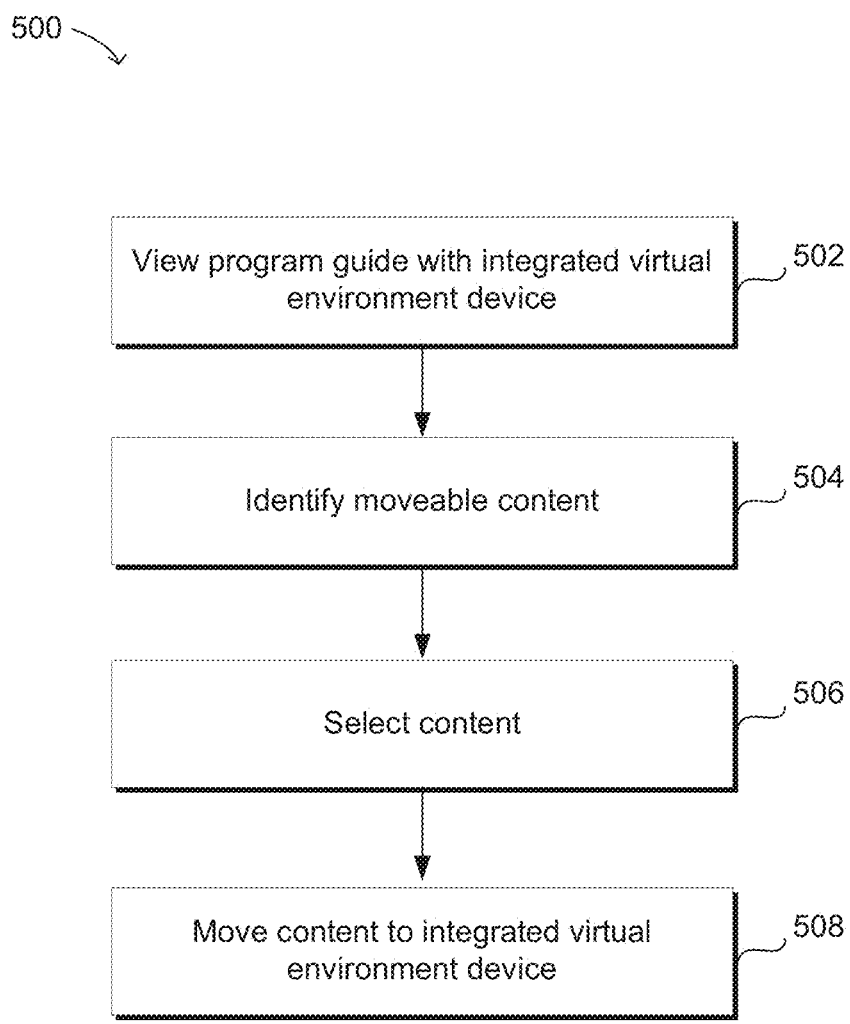
FIG. 5 is a flowchart illustrating a method in accordance with one embodiment.

Referring now to the flowchart 500 shown in FIG. 5 in conjunction with FIGS. 1-4, an exemplary media transfer method for selecting and moving video content to device 105 will now be described.

First, in step 502, the user 102 (wearing device 105) views program guide 172 on display 170. In this regard, the term "program guide" is used without loss of generality to refer to any graphical depiction of available content (icons, lists, etc.)—e.g., content available on SSTB 110 and/or server 130. As a non-limiting example, FIG. 4 depicts a simple, tabular program guide 400 that includes a list of available content (402A, 402B, etc.). As noted above, each item of content 402 will typically include movies, television shows, Internet video clips, and the like.

For various reasons (e.g., technical and/or legal), certain content 402 may be moveable to device 105, while other content may not be moveable to device 105. In order to determine which content is moveable, device 105 may query a back-end server (e.g., server 130) and/or STB 110, either of which may effectively flag certain content as moveable, and others as not moveable.

Device 105 is configured to identify the moveable content for user 102. That is, device 105 includes any combination of hardware and software (e.g., software stored in memory 306) capable of providing some form of visual cue on integrated display 230 that indicates to user 102 which items of content 402 may be moved to device 105 for later viewing on integrated display 230.

In the illustrated embodiment, for example, a glowing "aura" or other highlighting graphic 410 is made to encompasses a portion of program guide 400 that includes moveable content 402D. That is, graphic 410 is displayed on integrated display 230 in such a way that it is superimposed (from the standpoint of user 102) on the real-world program guide 400 (i.e., as viewed on display device 170 in FIG. 1).

Thus, device 105 provides a form of "augmented reality" with respect to program guide 400. This superposition is possible because device 105 is configured to determine the relative position of the displayed program guide 400 by virtue of forward facing camera 203 and the known position and orientation of device 105. That is, device 105 is configured to determine that the displayed program guide is within the line-of-site of device 105. In one embodiment, for example, device 105 recognizes program guide 400 (via pattern recognition of the guide itself or other visual cues in the display) and thereby knows where within integrated display 230 to provide the highlighting graphic. Such pattern recognition techniques are well known, and need not be described herein. It will be appreciated that the rectangular graphic 410 shown in FIG. 4 is not intended to be limiting. Any graphical technique for highlighting particular content in a program guide may be used, including, for example, pointers, an emphasized font, or the like.

Once the moveable content has been highlighted by device 105, the user 102 then selects the desired content (step 506). This may be accomplished in a variety of ways. In the illustrated embodiment, user 102 makes a gesture (e.g., pointing with hand 415) indicating the desired content, which is then observed by front-facing camera 203 and interpreted by device 105. In another embodiment, user 102 moves a pointer or other indicator using a touchpad provided on a surface of device 105. In another embodiment, user 102 makes a suitable eye motion that is sensed by rear-facing camera 202. That is, device 105 senses which piece of content 402 is being directly looking at by user 102, and then selects that content in response to the user blinking or performing some other action. In yet another embodiment, user 102 provides an audible instruction (e.g., "select movie number two") that is sensed by microphone 222 and interpreted by device 105.

Finally, in step 508, all or a portion of the selected content is moved to device 105. The moved content may be stored within device 105 (e.g., within memory 306) and/or streamed to device 105. As noted above, the content may be originally stored within STB 110, on server 130, or on some other device connected to network 130. In the event that some of the content must be decrypted, the appropriate keys may also be stored on device 105.

The above steps may be performed, for example, by non-transitory computer-readable media (e.g., RAM within device 105) bearing software instructions written in any suitable computer language and using any convenient set of APIs, libraries, and the like. In one embodiment, for example, the above steps are performed by software that includes Java® code executed within an Android® environment running on device 105. The invention is not so limited, however.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A media transfer method comprising:
   displaying, on a display device, a program guide including a plurality of items corresponding to media content;

determining which of the plurality of items are moveable items;

displaying, on an integrated virtual environment device, an image identifying the moveable items; and transferring at least one of the moveable items to the integrated virtual environment device in response to a selection made via the integrated virtual environment device.

2. The method of claim 1, wherein the image identifying the moveable items includes a graphical element superimposed on the display device via an integrated display provided within the integrated virtual environment device.

3. The method of claim 1, further including:

determining, via a front-facing camera provided within the integrated virtual environment device, that the program guide is within the line of sight of the integrated virtual environment device.

4. The method of claim 1, further including transferring an encryption key to the integrated virtual environment device, wherein the encryption key is associated with the at least one moveable item.

5. The method of claim 1, wherein the selection is made via a gesture made within the field-of-view of the integrated virtual environment device.

6. The method of claim 1, wherein the selection is made via eye-motion sensed by the integrated virtual environment device.

7. The method of claim 1, wherein the selection is made via a touchpad incorporated into the integrated virtual environment device.

8. The method of claim 1, wherein determining which of the plurality of items are moveable items is accomplished by querying a server over a network.

9. A media transfer system comprising:

an entertainment device configured to display a program guide comprising a plurality of items corresponding to media content; and an integrated virtual environment device including an integrated display, the integrated virtual environment device configured to determine which of the plurality of items are moveable items; display, on the integrated display, an image identifying the moveable items that are displayed on the entertainment device; and receive at least one of the moveable items at the integrated virtual environment device in response to a selection made via the integrated virtual environment device.

10. The media transfer system of claim 9, wherein the image identifying the moveable items includes a graphical element superimposed on the entertainment device via the integrated display.

11. The media transfer system of claim 9, wherein the integrated virtual environment device includes a front-facing camera and is configured to determine that the program guide is within the line of sight of the integrated virtual environment device using the front-facing camera.

12. The media transfer system of claim 9, wherein the integrated virtual environment device is configured to receive an encryption key associated with the at least one moveable item.

13. The media transfer system of claim 9, wherein the integrated environment device is configured to make the selection based on a gesture made within the field-of-view of the integrated virtual environment device.

14. The media transfer system of claim 9, wherein the integrated environment device is configured to make the selection based on an audio command received via a microphone provided within the integrated virtual environment device.

15. The media transfer system of claim 9, wherein the integrated environment device is configured to make the selection based on a signal from a touchpad provided on a surface of the integrated virtual environment device.

16. The media transfer system of claim 9, wherein the integrated environment device is configured to make the selection based on eye movement sensed by a rear-facing camera provided within the integrated virtual environment device.

17. Non-transitory computer-readable media bearing software instructions configured to instruct an integrated virtual environment device to:

determine whether a program guide is displayed within the field of view of the integrated virtual environment device, the program guide including a plurality of items;

determine which of the plurality of items are moveable items;

display, on an integrated display provided within the integrated virtual environment device, an image identifying the moveable items within the program guide; and receive at least one of the moveable items at the integrated virtual environment device in response to a selection made via the integrated virtual environment device.

18. The non-transitory computer-readable media of claim 17, wherein the image identifying the moveable items includes a graphical element superimposed on the program guide via the integrated display.

19. The non-transitory computer-readable media of claim 17, wherein the software instructions further instruct the integrated virtual environment device to make the selection based on a gesture made within the field-of-view of the integrated virtual environment device.

20. The non-transitory computer-readable media of claim 17, wherein the software instructions further instruct the integrated virtual environment device to make the selection based on eye-movement sensed by the integrated virtual environment device.

* * * * *